United States Patent [19]

Stockel

[11] 4,324,845
[45] Apr. 13, 1982

[54] METAL-OXIDE-HYDROGEN CELL WITH VARIABLE CONDUCTANT HEAT PIPE

[75] Inventor: Joseph F. Stockel, Rockville, Md.

[73] Assignee: Communications Satellite Corp., Washington, D.C.

[21] Appl. No.: 164,382

[22] Filed: Jun. 30, 1980

[51] Int. Cl.³ .......................................... H01M 10/50
[52] U.S. Cl. ..................................... 429/101; 429/120
[58] Field of Search ................................ 429/101, 120

[56] References Cited

U.S. PATENT DOCUMENTS

| | | | |
|---|---|---|---|
| 3,424,622 | 1/1969 | Dechert | 429/120 |
| 3,525,386 | 8/1970 | Grover | 429/120 |
| 4,115,630 | 9/1978 | Ommering et al. | 429/101 |
| 4,189,527 | 2/1980 | Stadnick et al. | 429/101 |

FOREIGN PATENT DOCUMENTS 2301107 10/1976 France .............................. 429/120

OTHER PUBLICATIONS

Feldman, et al., The Heat Pipe, Mech. Eng. 2/1967, pp. 30–33.

Primary Examiner—Donald L. Walton
Attorney, Agent, or Firm—Sughrue, Mion, Zinn, Macpeak & Seas

[57] ABSTRACT

A rechargable metal oxide-hydrogen cell having an electrode stack within a pressure vessel. The electrode stack is aligned on a control alignment member and has separate positive and negative bars coupling respective positive and negative electrodes to like terminals. A variable conductance heat pipe includes a portion of the alignment member and couples the interior of the electrode stack to a radiator. The heat pipe uses a working fluid such as Freon 21.

11 Claims, 2 Drawing Figures

METAL-OXIDE-HYDROGEN CELL WITH VARIABLE CONDUCTANT HEAT PIPE

BACKGROUND OF THE INVENTION

This invention relates to a metal-oxide-hydrogen cell and more particularly, to a variable conductant heat pipe which is an integral part of such a cell to improve thermal control.

Metal-oxide-hydrogen batteries are well-known as typified by U.S. Pat. No. 4,115,630. Typical is the nickel-hydrogen cell such as shown in FIGS. 5 and 6 of U.S. Pat. No. 4,115,630. Cells of that type have been used successfully as prime energy storage systems on earth satellites. The cell shown in U.S. Pat. No. 4,115,630 has been used, for example, aboard the NTS-2 (Navigation Technology Satellite-2) spacecraft. In such spacecraft designs battery modules can be located at various places on the spacecraft. For example, a preferred location is on an outside panel that may view cold space. Heat which is generated by the battery will be rejected to space as a result of a completely passive direct radiation system. In such passive systems, radiator sizing can be optimized to maintain battery temperatures at acceptable levels during various cyclic operations, for example, during period of trickle charge. However, passive systems are not generally effective during prolonged time periods where the radiator is exposed to the sun or heat generation rates vary vis-a-vis normal spacecraft orbital operation. For example, during periods of eclipse heat generation can cause significant rises in battery temperature.

For example, in the case of the NTS-2 a passive system was designed to maintain the battery at temperature levels of approximately 0° to 5° C. However, during eclipse battery temperatures were actually in the order of 15° C. to 25° C., that is, an increase of approximately 10° C.

Accordingly, within this technology a need exists to define a system having higher heat rejection rates to flatten the battery temperature profile and thereby lower the average operating temperature of the battery.

Accordingly, a requirement of thermal control in such spacecraft batteries exists which cannot be adequately satisfied by using completely passive direct radiation systems. Such completely passive systems do not have the ability to provide active thermal control during periods of high battery heating such as during periods of high battery heat dissipations such as eclipse periods.

In spacecraft power systems there is a standing design goal to increase usable energy density. Increases in energy density are accomplished by reducing overall weight of such spacecraft cells and/or increasing the depth of discharge of such systems. These design techniques in turn aggrevate problems of thermal control by increasing both the end of discharge and the average operating temperature. Passive systems are simply not satisfactory for such storage systems having very deep discharge cycles. If such were used, unacceptable temperature swings could result during operation of the system. For example, in the case of a low orbit spacecraft application, with a 90 minute orbital period stored energy would have to be removed within 30 minutes yet completely returned within 60 minutes. The limited amount of time for energy dissipation results in higher temperatures. Passive systems do not have the capability for variable heat control.

In addition to the passive system as used in a spacecraft environment, the prior art defines other techniques of passive thermal control in context of a non-spacecraft cell designs. One such technique is shown in Sanderson, U.S. Pat. No. 3,498,844, which shows the use of a heating vent 25 in FIG. 2 of that patent, located at the center of a primary fuel cell evaporator 20. In this passive heat transfer system, heat produced at the electrodes 8 and 10 causes the temperature of the working fluid to increase until it is high enough to open a pressure regulating valve 27. As a result, water vapor will be exhausted through vent 25 as a result of the pressure increase in the system.

Another passive system is shown in U.S. Pat. No. 3,865,630 which in FIG. 2 also shows a heat pipe 27 utilized as a heating device for electrolyte 23 in a molten salt battery. As shown in that system, the heat pipe is a unitary body which is integrated into the framework of the battery. The heat pipe cannot actively vary its conductants in response to a change in temperature of the system.

Metal-oxide-hydrogen batteries, in particular, nickel-hydrogen batteries, are assembled utilizing a multitude of cells having an electrode stack contained within a pressure vessel. As shown in FIG. 5 of U.S. Pat. No. 4,115,630 the pressure vessel 90 contains an electrode stack which is axially aligned on a centrally disposed rod 52. Two sets of electrodes comprising a first back-to-back stack of positive electrodes 74 are coupled to a positive bus bar 92 and a second stack of negative electrodes 78 are disposed relative to a negative bus bar 94. At one end of the cell, coupled to the negative bus bar, a negative support 114 is used as a negative terminal. At the other end, a fill tube 126 is disposed coaxially within a positive terminal 112 coupled to the positive bus bar 92. As indicated, such a cell relies on passive thermal control. The predominant transfer path for heat which is generated in the electrode stack within the cell is radially through the hydrogen gas and then through the pressure vessel to the battery structure and finally, radiated to space.

SUMMARY OF THE INVENTION

Given the shortcomings of the prior art passive systems, it is an object of this invention to provide an active thermal control system for use in metal oxide-hydrogen cells.

It is another object of this invention to improve the thermal control system of a nickel-hydrogen battery using an active control system by modulating the heat rejection rate.

A further object of this invention is to improve a nickel-hydrogen cell by using an active thermal control system which flattens the temperature profile of operation to thereby lower the average operating temperature of the cell.

A still further object of this invention is to define an active heat pipe system for use in metal gas energy storage cells.

These and other objects of this invention are accomplished by means of a variable conductance heat pipe which has no moving parts yet forms an active thermal control system. As a result of the use of heat pipe technology improved usable energy density for the battery results as a consequence of improved temperature control. Another significant accomplishment of this system is that the cells may now be placed anywhere within the spacecraft body as opposed to prior disposition along outside spacecraft panels. Accordingly, spacecraft design is given a wider degree of latitude and flexibility since there is no requirement that the cells be placed on an outside panel for direct passive radiation.

By using a heat pipe which connects the cell to a radiator which may be located on the spacecraft exterior, heat which is generated within the cell interior is transmitted by the heat pipe to a radiator. It is rejected into space by the radiator. During idle periods, for example, trickle charging between eclipse seasons, the active feedback controlled variable conductance heat pipe prevents low cell temperatures by significantly reducing the heat transfer to the radiator. The heat pipe itself can be fabricated from any electrolyte resistant material, for example, stainless steel or nickel. The wall thickness can be increased in the electrical current conducting region and also at the seal. This invention, therefore, utilizes a heat pipe as a part of one terminal forming the axial rod holding the electrode stack. Accordingly, the heat pipe in accodance with this invention serves not only as a portion of the active thermal control system but also as an electrical feedthrough, that is, a terminal of the cell.

This invention will be described in greater detail by referring to the accompanying drawing and the description of the preferred embodiment that follows.

DESCRIPTION OF THE PREFERRED EMBODIMENT

Figures 1, 2:
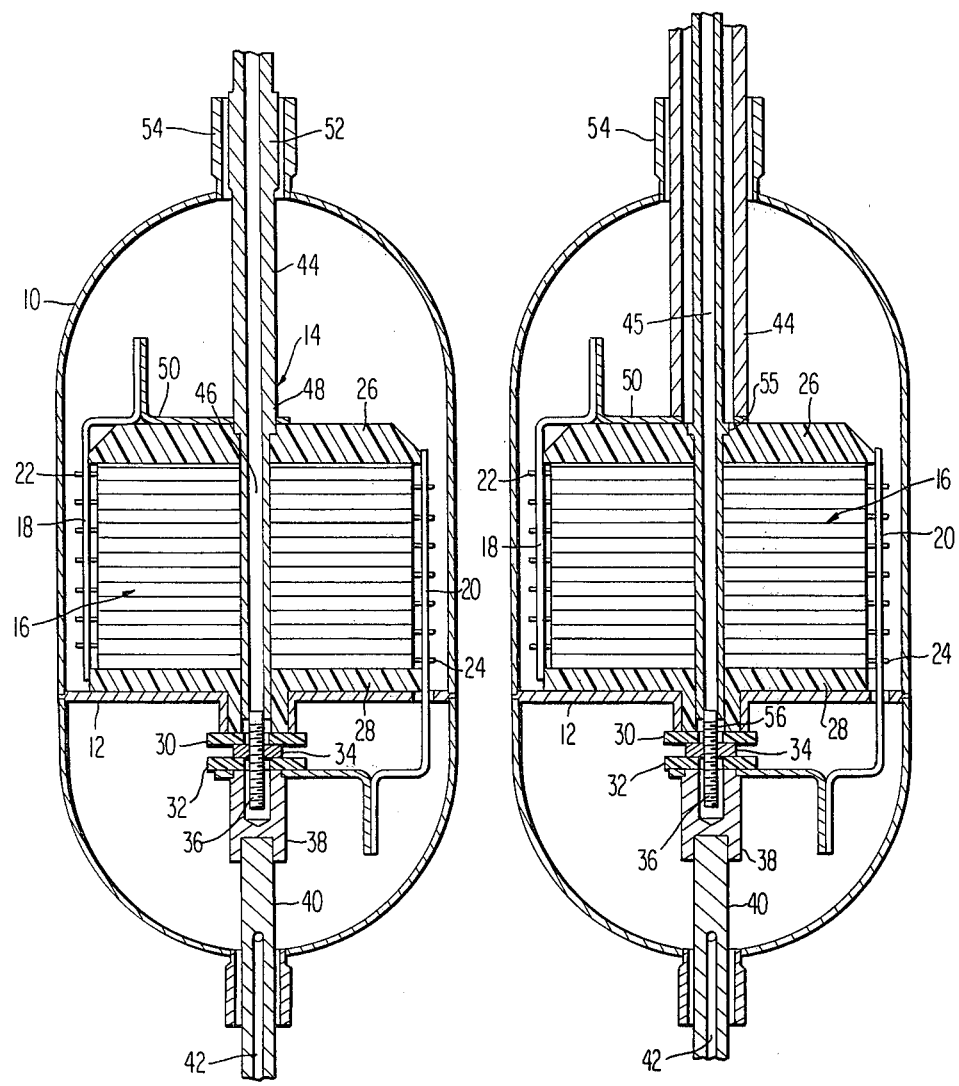
FIG. 1 is a cutaway side view of a first preferred embodiment of this invention showing a completed cell having a multi-electrode stack coupled in a parallel arrangement with the heat pipe in place.
FIG. 2 is a cutaway side view of a second preferred embodiment showing a completed cell having a multi-electrode stack with the heat pipe disposed in an electrically floating arrangement coaxial with the electrical current conductor.

Referring now to FIG. 1, a cutaway side view of a first embodiment of this invention is shown. This cutaway side view corresponds closely to the side view shown in FIG. 5 of U.S. Pat. No. 4,115,630 to the extent that a prior art cell structure is shown. However, FIG. 1 departs significantly in the sense that it shows a feedthrough utilizing the heat pipe as will be described herein.

As shown in FIG. 1, the operational cell is formed utilizing a pressure vessel 10 which is generally made in two half shell sections. Those shell sections can be made by hydroforming Inconel 718. A weld ring 12 is used to join the two sections. A more complete description of the pressure vessel in U.S. Pat. No. 4,115,630.

As shown in FIG. 1, an electrode stack array is disposed about a center rod assembly 14. The electrode stack 16 may be configured in a manner consistent with that described in U.S. Pat. No. 4,115,630 having a series of back-to-back electrodes forming a stack of positive and negative electrodes separated by separators. The positive electrodes are coupled to a positive bus bar 18 while the negative electrodes are coupled to a negative bus bar 20. These bus bars are used to couple individual electrodes, for example, by tabs 22, 24 which are coupled into slots in the respective bus bars. Top and bottom plates 26 and 28 are used to hold the stack in place by any customary means. They are held and aligned about the center rod 14 in compression.

As shown in FIG. 1, a pair of insulating washers 30, 32 separate nut 34 which is disposed about a threaded portion 36 of the rod 14. The negative bus bar 20 has a coupling portion 38 to provide a conductive path between the respective electrodes and a negative terminal feedthrough 40.

The negative feedthrough 40 has a fill port 42 used to load the pressure vessel with electrolyte and hydrogen gas. These aspects of a metal oxide-hydrogen cell are considered conventional and shown in the prior art. In this invention coupling of the feedthrough is to the negative bus, but coupling to the positive bus in the prior U.S. Pat. No. 4,115,630 is equivalent.

As shown in FIG. 1, the positive feedthrough 44 forming a component part of the axial rod 14 utilizes an axially disposed heat pipe 46 which extends into the center portion of the electrode stack. The heat pipe is fabricated from any electrolyte resistant material such as stainless steel or nickel. As shown in FIG. 1, the heat pipe has a variable wall thickness, thinner at the central section 46 and having a thicker section 48 at the current conducting regions. The section 48 of the heat pipe is coupled to the positive bus bar 18 by means of a flange member 50.

Additionally, a third region of a still thicker cross-sectional area is provided in the region 52 disposed relative to the compression seal 54. The inside of the compression seal 54 is generally made of a plastic material and is crimped to reduce its diameter. This effectively seals the positive feedthrough 44.

The interior of the heat pipe 46 is loaded with a suitable working fluid such as Freon 21. As shown in FIG. 1, given the central location of the working fluid within the electrode stack, conduction of heat is maximized within the cell structure. Moreover, because the heat pipe must penetrate through the pressure vessel wall, it is ideally suited to perform the complimentary task of electrical feedthrough, in this case, coupling the positive bus bar to the outside electrical system forming the complete battery.

In the system shown in FIG. 1 thermal resistance is in the order of 0.04° C./watt. This value should be compared with the existing thermal existance in the order of 0.93° C./watt for conventional hydrogen gap cells as typified by that shown in U.S. Pat. No. 4,115,630.

While the invention has been shown with respect to the preferred embodiment of FIG. 1, modifications of this system are possible within the scope of the invention. For example, as shown in FIG. 2, a dual compression seal is utilized. In this system, the positive feedthrough 44 comprises an outer conductive member with an inner coaxial heat pipe member 45. The electrical feedthrough 44 is coupled to the flange 50 in a manner consistent with that shown in FIG. 1. The heat pipe 45 is therefore electrically floating and is held in place by means of a flange element 55 abutting a notched portion of the top inplate 26. The lower portion of the heat pipe is held in place by means of a threaded portion 56 in the nut 34 disposed between the two insulating washers 30 and 32.

Because the heat pipe is a separate element, there is no requirement that it have a variable wall thickness to accomodate electrical current conduction. Accordingly, the heat pipe 45 is of a unitary cross-section within the positive feedthrough 44, with that latter element having generally a greater wall thickness to accomodate electrical current conduction. A seal element 54 is crimped consistent with the seal in FIG. 1 to hemispherically seal the pressure vessel at 10 yet provide an insulating seal at the point of exit of the positive feedthrough, a similar compression seal is used with respect to the negative feedthrough.

Another modification of this system would be to use the heat pipe as an electrical current conductor but to have the heat pipe directly welded to the pressure vessel. In such a system, the pressure vessel would not be electrically floating and, accordingly, appropriate insulators would be needed between the pressure vessel and appropriate elements of the electrode stack to prevent a short circuit condition. However, with the heat pipe welded directly to the pressure vessel, one compressive seal can be eliminated.

It is apparent that other modifications of this invention are possible without departing from the scope of the invention.

I claim:

1. In a rechargable metal oxide-hydrogen cell having an outer shell, an electrode stack within said shell having positive and negative electrodes positioned on an alignment member, positive and negative bus bars coupling respective positive and negative electrodes to like conductive terminals, the improvement comprising a variable conductance heat pipe including at least a portion of said alignment member, said heat pipe coupling the interior of the electrode stack to a radiator outside said shell, and a working fluid within said heat pipe.

2. The apparatus of claim 1, further comprising conductive means to electrically couple one of said bus bars to said heat pipe, wherein said heat pipe is an electrical feedthrough conductor from one set of electrodes to an electrical terminal outside said shell.

3. The apparatus of claim 2 wherein said electrode stack is axially aligned about said heat pipe and said heat pipe comprises a variable wall thickness pipe having increased wall thickness in the portions between said electrical coupling means and said electrical terminal.

4. The apparatus of claims 1, 2 or 3 further comprising first means to secure said heat pipe to said shell and second means to secure said heat pipe within said shell.

5. The apparatus of claim 4 wherein said first means comprises a compression seal securing said heat pipe to said shell and said second means comprises a threaded coupling between said alignment rod and a securing member.

6. The apparatus of claim 1 wherein said heat pipe comprises said alignment member and is axially disposed in said shell.

7. The apparatus of claim 6 further comprising conductor means coaxial with said heat pipe and insulated therefrom coupling one bus bar to an electrical terminal outside said shell.

8. The apparatus of claim 7 wherein the wall thickness of said conductor means is greater than the wall thickness of said heat pipe.

9. The apparatus of claims 2, 3, 7 or 8 wherein said conductor means is coupled to the positive electrical bus bar.

10. The apparatus of claims 1, 2, 3, 6, 7 or 8 wherein said heat pipe comprises an electrolyte resistant material such as stainless steel or nickel.

11. The apparatus of claims 1, 2, 3, 6, 7 or 8 wherein said working fluid is Freon 21.

* * * * *